United States Patent [19]

Myers

[11] 3,941,219

[45] Mar. 2, 1976

[54] DUAL PISTON BRAKE ARRANGEMENT AND COOLING CIRCUIT THEREFOR

[75] Inventor: Allen D. Myers, Decatur, Ill.

[73] Assignee: Caterpillar Tractor Co., Peoria, Ill.

[22] Filed: Jan. 31, 1975

[21] Appl. No.: 545,854

[52] U.S. Cl. .............. 188/170; 188/71.6; 188/72.3; 188/264 D
[51] Int. Cl.² ......................................... F16D 65/24
[58] Field of Search ..... 188/170, 72.3, 71.6, 264 D, 188/264 E, 264 P; 192/83, 86, 91 A, 113 B; 92/62, 63, 64; 303/9

[56] References Cited
UNITED STATES PATENTS

| | | | |
|---|---|---|---|
| 2,928,504 | 3/1960 | Hahn et al. | 188/71.6 X |
| 3,547,233 | 12/1970 | Girvan | 188/170 |
| 3,547,234 | 12/1970 | Cummins et al. | 188/170 |
| 3,613,839 | 10/1971 | MacDuff | 188/72.3 X |
| 3,661,230 | 5/1972 | Burnett | 188/170 X |
| 3,680,666 | 8/1972 | Sommer | 188/264 E X |
| 3,770,085 | 11/1973 | Cottingham | 188/170 X |

FOREIGN PATENTS OR APPLICATIONS 2,013,127  7/1968  France ..................... 92/63

Primary Examiner—Trygve M. Blix
Assistant Examiner—Douglas C. Butler
Attorney, Agent, or Firm—Ralph E. Walters

[57] ABSTRACT

A dual piston brake arrangement for selective holding engagement of a rotatable member of a drive train includes a support structure, a service brake piston axially reciprocably and nonrotatably mounted within the support structure with a fluid passage therethrough, a fluid actuator for biasing the service brake piston toward a brake holding position, a secondary brake piston axially reciprocably and nonrotatably mounted within the support structure and in substantially radially aligned relation within the service brake piston for selective telescopic movement from an abutting to a separated condition therefrom, and a fluid circulating system for delivering a fluid radially outwardly adjacent the rotatable member and the service brake piston for cooling thereof and subsequently along an egress path including flow of the fluid through the fluid passage in the service brake piston.

6 Claims, 1 Drawing Figure

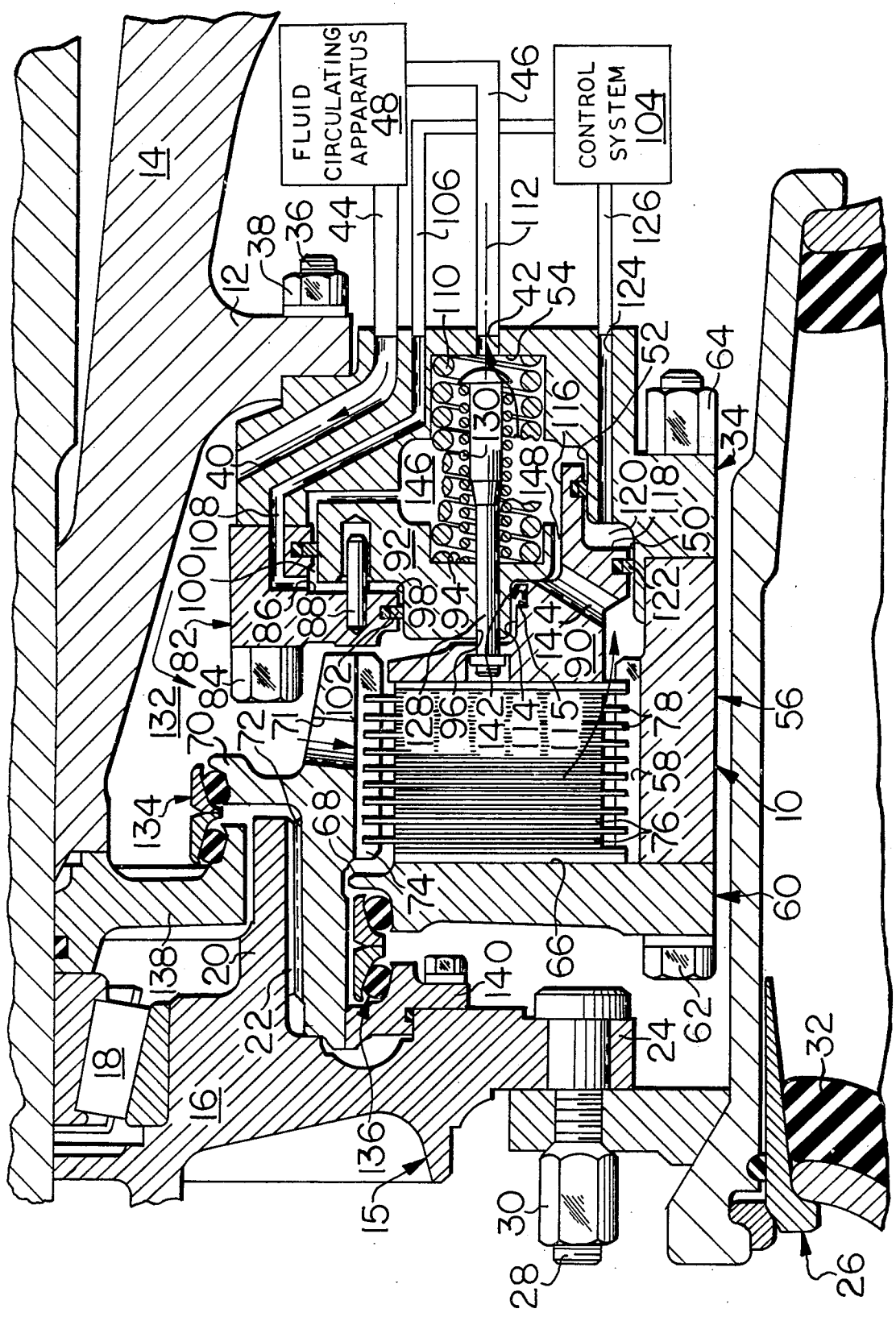

DUAL PISTON BRAKE ARRANGEMENT AND COOLING CIRCUIT THEREFOR

BACKGROUND OF THE INVENTION

Fluid operated, oil-cooled brake arrangements are actively being developed for large material hauling vehicles and the like in order to achieve both safe and effective braking. However, not before the annular dual piston brake arrangement disclosed in U.S. patent application Ser. No. 522,390 filed Nov. 11, 1974 by P. F. M. Prillinger et al, and assigned to the assignee of the present invention, has multipurpose capacity braking been provided in such a compact and economical package. The referenced construction not only integrates service braking with emergency braking and/or parking braking in an improved manner, but also is sufficiently radially compact that it can fit relatively closely within a wheel rim while maintaining a high capacity.

While the aforementioned dual piston brake arrangement is a considerable advancement over the prior art brake mechanisms, the egress of cooling fluid posed certain sizing and constructional limitations on the various members thereof because space is not available radially outwardly of the brake arrangement. Particularly, in order to permit axial egress of the cooling fluid therefrom, the maximum radial dimensions of the service brake piston and its associated actuation chamber and also the maximum radius of the pitch circle for the compression spring members used therewith were limited. Consequently, a fewer number of compression springs could be disposed equally around the pitch circle so that they individually had to be increased in length and/or capacity. These radial limitations subsequently reduced the maximum capacity of the subject brake arrangement for a particular maximum external diameter, and undesirably added to the weight and cost of the package.

SUMMARY AND OBJECTS OF THE INVENTION

Accordingly, it is an object of the present invention to provide a dual piston brake arrangement and cooling circuit therefor which is not only radially compact for disposition within a vehicle wheel rim of relatively limited internal diameter, but also is of relatively high capacity.

Another object is to provide a dual piston brake arrangement of the aforementioned type having a cooling circuit with improved axial egress of the cooling fluid in order to avoid diametrical restrictions on certain members of the brake arrangement.

Another object is to provide a dual piston brake arrangement of the character described which has a relatively large diameter service braking piston actuation chamber and also a relatively large diameter pitch circle for accommodating a greater number of compression springs to effect a weight and cost savings for a predetermined braking capacity.

Other objects and advantages of the present invention will become more readily apparent upon reference to the accompanying drawing and following description.

BRIEF DESCRIPTION OF THE DRAWING

The drawing is a fragmentary central vertical section of a dual piston brake arrangement embodying the features of the present invention as taken through the axis of a vehicle axle housing and showing the lower half thereof including a portion of a wheel rim arrangement and the improved cooling circuit therefor.

DESCRIPTION OF THE PREFERRED EMBODIMENT

With reference to the drawing, an oil-cooled dual piston brake arrangement 10 embodying the features of the present invention is axially mounted outboard, or to the left in the drawing, of a radially extending annular mounting flange 12. Such flange is integrally associated with a conically tapered axle housing 14 such as is found on a large earthmoving truck or the like. A vehicle drive train 15 including a wheel hub 16 is rotatably supported on the axle housing axially outwardly of the brake arrangement by an antifriction bearing 18. The wheel hub includes an axially inwardly extending flange 20 with an external spline 22 thereon, and a radially outwardly extending flange 24 to which is secured a wheel rim arrangement generally identified by the reference numeral 26. As is apparent from the drawing, the wheel rim arrangement is secured to flange 24 by a plurality of circumferentially spaced lug bolts 28 and associated nuts 30. A tire 32 is sealingly mounted on the wheel rim arrangement and upon screw threadably removing the nuts, the tire and wheel rim arrangement may be pulled axially outwardly as a unit from the lug bolts and the axle housing for servicing of the drive train in the usual manner.

The dual piston brake arrangement 10 includes an anchoring inner end plate 34 which is removably secured to the mounting flange 12 of the axle housing 14 by a plurality of threaded studs 36 anchored to the end plate and extended axially inwardly through the flange for screw threaded receipt of a plurality of retaining nuts 38 thereon. Formed through the end plate are a cooling fluid inlet passage 40 amd an outlet passage 42 which are respectively in communication with an inlet conduit 44 and an outlet conduit 46 for the purpose of normally continuously allowing the circulation of a cooling fluid through the brake arrangement by way of a fluid circulating apparatus 48. Further, the end plate has formed therein an outer counterbore 50 and an inner counterbore 52 disposed in axially outwardly facing piston-receiving relation, and a plurality of circumferentially spaced spring-receiving cavities 54 opening endwardly on the inner counterbore and in open communication with the outlet passage 42.

The dual piston brake arrangement 10 also includes a centrally disposed cylindrical shell 56 having a plurality of internal teeth 58 formed therein which are disposed in substantial axial alignment with the outer counterbore 50 of the end plate 34. The shell extends axially outwardly in spanning relation between the inner end plate and an outer end plate 60, and in order to secure them together a plurality of elongated bolts 62 are inserted axially inwardly therethrough which are adapted to screw threadably receive a coresponding plurality of retaining nuts 64 thereon. In this manner the outer end plate is suitably anchored, to thereby provide an annular inwardly facing thrust surface 66 against which the brake arrangement is clamped.

The outer end plate 60 is also provided with a circular aperture 68 centrally therethrough so that it may be spaced relatively radially closely to the external spline 22 of the wheel hub 16. However, a cylindrical connecting drum 70 having a plurality of cooling fluid access passages 71 radially therethrough still has sufficient clearance to extend axially inwardly through this aperture from a position wherein an internal spline 72 thereon is engaged with the external spline of the hub. Consequently, the connecting drum rotates with movement of the vehicle and has a plurality of external teeth 74 about the periphery thereof on which are keyed a plurality of brake discs 76. These discs are interleaved with a plurality of brake plates 78 which are similarly keyed to the internal teeth 58 of the shell 56.

The dual piston brake arrangement 10 of the present invention also includes a parking brake housing 82 which is secured tightly against the inner end plate 34, and thereby effectively to the axle housing 14, by a plurality of retaining bolts 84 inserted therethrough for screw threaded engagement with the end plate. An inwardly facing, annular step 86 is formed about the periphery thereof, and a piston retaining and aligning dowel 88 is rigidly mounted for axially inward extension therefrom.

Actuation of the dual piston brake arrangement 10 is accomplished by axial reciprocating movement of an annular service brake piston 90 and an annular secondary or parking brake piston 92 telescopically nested radially within it. The inner parking brake piston is normally disengaged, or disposed to the right of its position in the drawing, but is selectively or automatically actuated for either parking or emergency braking purposes as will hereinafter be described. The parking brake piston is axially reciprocably and nonrotatably secured to the parking brake housing 82 by the guiding and aligning dowel 88, and includes a plurality of spring-receiving cavities 94 opening axially inwardly thereof and a plurality of guide-receiving bores 96. Further, it includes an axially outwardly facing counterbore 98 which cooperates with the annular step 86 of the parking brake housing 82 in such a manner as to define a fluid retractor or sealed parking brake actuation chamber 100 therebetween. A pair of seal ring assemblies 102 define the radially outer and inner limits of this actuating chamber, and fluid pressure is delivered thereto from a brake control system 104 by way of an interconnecting conduit 106 and an internal passage 108. Pressurization of the chamber normally positions the parking brake piston 92 axially to the right when viewing the drawing against the opposition of a plurality of relatively high capacity compression springs 110. These compression springs are substantially equally circumferentially spaced around the periphery of the brake arrangement, and are seated intermediate the cavities 54 and 94 on a common spring pitch circle 112 having a relatively large radius.

As mentioned generally above, the service brake piston 90 is arranged in telescopingly compact and radially aligned relation outwardly of the secondary or parking brake piston 92. More particularly, it includes an inner counterbore 114 and a seal ring groove 115 opening thereon, and an outer counterbore 116 adapted to axially receive the secondary brake piston reciprocably therein. It further has around its periphery an inwardly facing, annular step 118 which effectively cooperates with the counterbores 50 and 52 of the inner end plate 34 to define a fluid actuator or sealed service brake actuation chamber 120 therebetween with the aid of a pair of seal ring assemblies 122. Such seal ring assemblies define the radially outer and inner limits of this actuation chamber, and it is to be noted that the outer limit thereof is substantially axially aligned with the internal teeth 58 of the shell 56. Fluid pressure is selectively delivered to this actuation chamber through an internal passage 124 and an interconnected conduit 126 leading to the brake control system 104. With pressurization thereof, the service brake piston moves axially outwardly or to the left when viewing the drawing to compress the brake discs 76 and the brake plates 78 against the thrust surface 66. Thus, the discs and plates are frictionally clamped against each other for selective holding engagement of the connecting drum 70 and the vehicle drive train 15.

As is apparent from the drawing, a plurality of shouldered guide pins 128 are removably secured to the service brake piston 90 so that they individually extend freely slidably through the bores 96 in the secondary brake piston 92. In this manner, relative axial movement of the two pistons is permitted, while the relative rotation thereof is prevented. Each of these pins also guidably entraps a relatively light capacity retraction spring 130 thereon for the purpose of retracting the service brake piston in the absence of pressure fluid in the actuation chamber 120.

In accordance with the present invention, the dual piston brake arrangement 10 is fully peripherally cooled by the circulation of cooling fluid from the fluid circulating apparatus 48, the inlet conduit 44, and the inlet passage 40 communicating with a centrally disposed internal chamber 132. Because of the relative rotary motion between the wheel hub 16 and the axle housing 14, and members secured thereto, an annular internal seal arrangement 134 and an annular external seal arrangement 136 are required. The internal seal arrangement is generally disposed between an adapter member 138 secured to the axle housing 14 and the rotatable connecting drum 70, while the external seal arrangement is sealingly disposed between the outer end plate 60 and another adapter member 140 secured to the wheel hub 16.

More particularly, the present invention provides an annular lip-type seal ring 142 of glass fiber filled polytetrafluoroethylene or comparable resilient material which is mounted in the groove 115 of the service brake piston 90 in radially sealing relation against the parking brake piston 92. In this way the clearance between the service brake piston and the parking brake piston is effectively sealed to prevent the aforementioned cooling fluid from passing radially outwardly therebetween in bypassing relation with respect to the brake discs 76 and brake plates 78. Such lip-type seal ring has a relatively low coefficient of friction and the ability to remain resilient over a wide range of operating temperatures. Further, it is oil resistant and adaptable to a relatively wide range of diametrical dimensions and eccentricity tolerances which may normally occur in the manufacturing of the pistons.

For the purpose of allowing cooling fluid egress, the present invention further provides a plurality of equally circumferentially spaced, flow directing passages 144 through the periphery of the service brake piston 90. These radially inwardly inclined or convergingly oriented passages communicate with an annular spring chamber 146 through a radial gap 148 defined radially between the periphery of the parking brake piston 92 and the counterbore 116 of the service brake piston 90. Subsequently, fluid egress from the chamber is by way of the outlet passage 42, the outlet conduit 46, and the fluid circulating apparatus 48.

OPERATION

While the operation of the present invention is believed clearly apparent from the foregoing description, further amplification will subsequently be made in the following brief summary of such operation. As shown in the drawing, the service brake piston 90 and the parking brake piston 92 are disposed to the left when no fluid pressure is present in either of the service brake or parking brake actuation chambers 120 or 100, respectively. This condition corresponds to either a vehicle parking or an emergency braking condition, wherein the compression springs 110 apply a substantial load axially outwardly against the parking brake piston to urge it abuttingly against the service brake piston. In turn, the leftward force of the service brake piston serves to compress the interleaved brake discs 76 and brake plate 78 against the thrust surface 66 of the outer end plate 60, and to thereby effectively secure the connecting drum 70, the wheel hub 16 and wheel rim arrangement 26 to the axle housing 14 for braking thereof.

To allow vehicle movement, however, pressurized fluid is communicated from the control system 104 to the parking brake actuation chamber 100 via the conduit 106 and the passage 108 for fully retracting the parking brake piston 92 and thereby overcoming the loading of the compression springs 110. In the absence of any operating pressure in the service brake actuation chamber 120, the axially inward or rightward movement of the parking brake piston also serves to retract the service brake piston because of the action of the additionally axially compressed retraction springs 130.

In accordance with operator demand, service braking is thereafter achieved by selectively modulating fluid delivery from the brake control system 104, the conduit 126, and the passage 124 to the service brake actuation chamber 120. This moves the service brake piston 90 axially outwardly, in longitudinally spaced relation away from the retracted parking brake piston 92, to selectively clamp the interleaved brake discs 76 and brake plates 78 together with the desired force. In this way a holding force is applied to the wheel hub 16 and wheel rim arrangement 26 to retard or stop the vehicle. Reference is herein made to the aforementioned U.S. patent application Ser. No. 522,390 for supplementary operational details of such annular dual piston brake arrangement.

In accordance with the present invention, cooling fluid is continually circulated at a rate of approximately 75 gpm (4.7 liters per sec.) by the fluid circulating apparatus 48 in a generally counterclockwise manner when viewing the drawing as shown by the arrows. Cooling fluid ingress is by way of the conduit 44 and the passage 40 to the internal chamber 132. From this collecting chamber the fluid at a relatively low effective pressure of approximately 20 psi (1.4 Kg per sq. cm.) passes radially outwardly through the passages 71 in the connecting drum 70 to impinge upon and cool the brake discs 76 and the brake plates 78, as well as the service brake piston 90. Although not shown, it should be understood that these discs and/or plates are provided with a plurality of conventional surface grooves which permit cooling fluid flow therethrough even though they are tightly pressed together. Beneficially, the lip-type seal ring 142 between the service brake piston and parking brake piston 92 prevents this cooling fluid from passing radially outwardly therebetween and assures flow solely through the interleaved brake discs and plates.

In keeping with one of the principal objects of the invention, the egress path of this cooling fluid is accomplished by allowing it to flow axially and radially obliquely inwardly through the flow-directing passages 144 in the service brake piston 90. Cooling fluid egress thereafter continues substantially axially through the annular gap 148, the spring chamber 146, the outlet passage 42, and the outlet conduit 46 to return to the fluid circulating apparatus 48 to complete the egress path routing thereof. It is important to note that fluid egress by way of the inclined passages 144 in the service brake piston permits the service brake actuation chamber 120 to be disposed radially outwardly a relatively maximum permissible amount. In this way the radially outer and inner limits thereof, corresponding to the disposition of the seal ring assemblies 122, are a maximum so that less pressure is needed in the actuation chamber to achieve a particular force on the piston. A further advantage of this radially outward chamber location is that the spring pitch circle 112 can also be at a larger radius. This enables a greater number of springs to be positioned equally around the pitch circle, so that to provide a predetermined maximum force on the parking brake piston 92 a savings in axial length and/or spring size can be effected.

Therefore, it is apparent that the dual piston brake arrangement 10 of the present invention provides a telescopically related arrangement of the annular service brake piston 90 and the annular parking brake piston 92 with an improved cooling circuit therefor which permits the service braking piston actuation chamber 120 and the greater number of compression springs 110 to be disposed radially outwardly at a maximum radius for improved compactness. Maximum use of available space within the vehicle wheel rim arrangement 26 is coupled with the substantial axial alignment of these springs with the brake pistons for high capacity engagement thereof.

While the invention has been described and shown with particular reference to a preferred embodiment, it is apparent that variations might be possible that would fall within the scope of the present invention, which is not intended to be limited except as defined in the following claims.

What is claimed is:

1. An annular dual piston brake arrangement for selective holding engagement of a rotatable member of a drive train, having an annular braking surface thereon, comprising;

a support structure;

an annular service brake piston axially reciprocably and nonrotatably mounted within said support structure including fluid passage means therethrough;

actuating means for biasing said annular service brake piston concentrically toward a brake holding position with respect to the annular braking surface of such rotatable member;

an annular secondary brake piston axially reciprocably and nonrotatably mounted within said support structure and in substantially radially aligned compact relation within said service brake piston for telescopic selective movement from an abutting to a separated condition therefrom; and fluid circulating means for delivering a fluid radially outwardly toward said rotatable member and said service brake piston for cooling thereof and subsequently along an egress path including flow of said fluid through said fluid passage means in said service brake piston.

2. The dual piston brake arrangement of claim 1 including seal means disposed intermediate said service brake piston and said secondary brake piston for preventing the radially outwardly flowing cooling fluid from escaping therebetween and bypassing cooling of said rotatable member.

3. The dual piston brake arrangement of claim 2 wherein said service brake piston includes an axially inwardly open counterbore, and said secondary brake piston is positioned axially within said counterbore, and said seal means includes an annular seal ring cooperatively disposed therebetween.

4. The dual piston brake arrangement of claim 3 wherein said service brake piston further defines an internal groove opening radially inwardly on said counterbore and said annular seal ring is a lip-type seal ring disposed in said groove for facing engagement against said peripheral surface of said secondary brake piston.

5. The dual piston brake arangement of claim 4 wherein said lip-type seal ring is made of glass fiber filled polytetrafluoroethylene.

6. A dual piston brake arrangement for selective holding engagement of a rotatable member of a drive train, comprising;
a support structure;
an annular service brake piston axially reciprocably and nonrotatably mounted within said support structure including a plurality of fluid flow directing passages therethrough;
fluid actuating means for biasing said service brake piston concentrically toward a brake holding position with respect to such rotatable member;
an annular secondary brake piston axially reciprocably and nonrotatably mounted within said support structure in substantially radially aligned relation within said service brake piston for axially telescopic selective movement from an abutting to a separated condition therefrom;
spring engagement means acting upon said support structure for biasing said secondary brake piston directly axially against said service brake piston;
fluid retracting means for holding said secondary brake piston in a disengaged condition in overcoming relation with respect to said spring engagement means;
seal means intermediate said support structure, said service brake piston and said secondary brake piston serving to define a spring chamber therebetween; and
a fluid circulating apparatus for delivering a fluid radially outwardly toward said rotatable member for cooling thereof and subsequently along an egress path including flow of said fluid through said plurality of fluid flow directing passages in said service brake piston and through said spring chamber.

* * * * *